United States Patent
Ortega et al.

(10) Patent No.: US 8,948,511 B2
(45) Date of Patent: Feb. 3, 2015

(54) AUTOMATED DOCUMENT PROCESSING SYSTEM

(75) Inventors: Daniel Ortega, Barcelona (ES); Sherif Yacoub, Barcelona (ES); Jose Abad Peiro, Barcelona (ES); Paolo Faraboschi, Barcelona (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 1877 days.

(21) Appl. No.: 11/253,305

(22) Filed: Oct. 19, 2005

(65) Prior Publication Data

US 2006/0274938 A1   Dec. 7, 2006

Related U.S. Application Data

(60) Provisional application No. 60/686,590, filed on Jun. 2, 2005.

(51) Int. Cl.
  *G06K 9/34* (2006.01)
  *G06K 9/00* (2006.01)

(52) U.S. Cl.
  CPC ........ *G06K 9/00463* (2013.01); *G06K 9/00469* (2013.01)
  USPC ........... 382/176; 382/173; 382/177; 715/243; 715/264

(58) Field of Classification Search
  CPC .................. G06K 9/00463; G06K 9/00469
  USPC ......... 382/173, 180, 177, 284, 176, 305, 312, 382/321; 715/243, 264, 252, 253, 234, 247; 358/1.6
  See application file for complete search history.

(56) References Cited

U.S. PATENT DOCUMENTS

| | | | | |
|---|---|---|---|---|
| 5,848,184 | A * | 12/1998 | Taylor et al. | 382/173 |
| 5,892,843 | A * | 4/1999 | Zhou et al. | 382/176 |
| 6,009,196 | A * | 12/1999 | Mahoney | 382/176 |
| 7,379,594 | B2 * | 5/2008 | Ferman et al. | 382/176 |
| 2006/0080309 | A1 | 4/2006 | Yacoub et al. | |

FOREIGN PATENT DOCUMENTS

WO   2007018501 A1   2/2007

OTHER PUBLICATIONS

Jongwoo Kim, Daniel X. Le, George R. Thoma, "Automated Labeling in Document Images", <http://archive.nlm.nih.gov/pubs/kim/spie2001/spie2001.php>, proceeding of the SPIE, p. 1-12; published in 2001.*

(Continued)

*Primary Examiner* — Mekonen Bekele
(74) *Attorney, Agent, or Firm* — Lee & Hayes, PLLC; David S. Thompson

(57) ABSTRACT

An automated document processing system is configured to normalize zones obtained from a document, and to extract articles from the normalized zones. In one configuration, the system receives at least one zone from the document, and applies at least one zone-breaking factor, thereby creating normalized sub-zones within which text lines are consistent with the at least one zone-breaking factor. The normalized sub-zones may be evaluated to obtain a reading order. Adjacent sub-zones are joined if text similarity exceeds a threshold value. Weakly joined sub-zones are separated where indicated by a topic vectors analysis of the weakly joined sub-zones.

7 Claims, 13 Drawing Sheets

(56) References Cited

OTHER PUBLICATIONS

G.R. Thoma et al. "Text Verification in an Automated System for the Extraction of Bibliographic Data", Springer-Verlag Berlin Heidelberg 2002, p. 423-432.*

Jongwoo Kim, Daniel X. Le, George R. Thoma, "Automated Labeling in Document Images", /archive.nlm.nih.gov/pubs/kim/spie2OO1/spie2OOI.php>, proceeding of the SPIE, p. 1-12; published in 2001.*

McCallum, "Bow: A Toolkit for Statistical Language Modeling, Text Retrieval, Classification and Clustering", http://www.cs.cmu.edu/~mccallum/bow. 1996.

Cohen, "Learning to Classify English Text with ILP Methods", Aug. 1995.

Yang, "An Evaluation of Statistical Approaches to Text Categorization", School of Computer Science, Apr. 1997.

Toutanova et al. "Test Classification in a Hierarchical Mixture Mode for Small Training Sets".

Broder et al., "SRC Technical Note: Syntactic Clustering of the Web", 1997-015, Jul. 1997, file://C:/Documents and Settings/davidt/Desktop/5-broder.html.

Yang et al., "A Study of Approaches to Hypertext Categorization", School of Computer Science, pp. 1-25.

Wikipedia, "Machine learning," Aug. 30, 2005, <http://web.archive.org/web/20050830140939/http://en.wikipedia.org/wiki/Machine_Learning>.

* cited by examiner

AUTOMATED DOCUMENT PROCESSING SYSTEM

RELATED APPLICATIONS

This patent application claims priority to U.S. patent application Ser. No. 60/686,590, titled "Method for improving document page analysis," filed on Jun. 2, 2005, commonly assigned herewith, and hereby incorporated by reference.

TECHNICAL FIELD

The present disclosure generally relates to document processing, and more particularly to defining zones within documents and to extracting articles from documents.

BACKGROUND

In large-volume automated document analysis and understanding systems, paper documents are scanned and processed using OCR (optical character recognition) and region analysis programs. OCR (and/or segmentation) engines break each page into individual "zones," within which the image of text has been translated into editable text. In some applications, the OCR engines are configured to include the segmentation engines, and to thereby combine various functions advantageously.

Unfortunately, the zones created by such OCR engines fail to provide the flexibility required by applications configured to process the zones. For example, article-extraction applications are configured to extract articles from zones created by OCR engines. During operation of such an application, several zones representing text associated with several articles may be on one page of a document. However, articles are often assembled with "extra" and/or "missing" zones.

Accordingly, a need exists for an automated document processing system that is better able to configure zones, and that is better able to extract articles.

SUMMARY

An automated document processing system is configured to normalize zones obtained from a document, and to extract articles from the normalized zones. In one configuration, the system receives at least one zone from the document, and applies at least one zone-breaking factor, thereby creating normalized sub-zones within which text lines are consistent with the at least one zone-breaking factor. The normalized sub-zones may be evaluated to obtain a reading order. Adjacent sub-zones are joined if text similarity exceeds a threshold value. Weakly joined sub-zones are separated where indicated by a topic vectors analysis of the weakly joined sub-zones.

BRIEF DESCRIPTION OF THE DRAWINGS

The following description refers to the accompanying figures. In the figures, the left-most digit(s) of a reference number identifies the figure (Fig.) in which the reference number first appears. Moreover, the same reference numbers are used throughout the drawings to reference like features and components.

FIGS. 10 and 11 illustrate operation of the document processing system of FIG. 1, wherein FIG. 10 shows a diagram representing input to the system and FIG. 11 shows a diagram representing output from the system.

DETAILED DESCRIPTION

Figure 1:
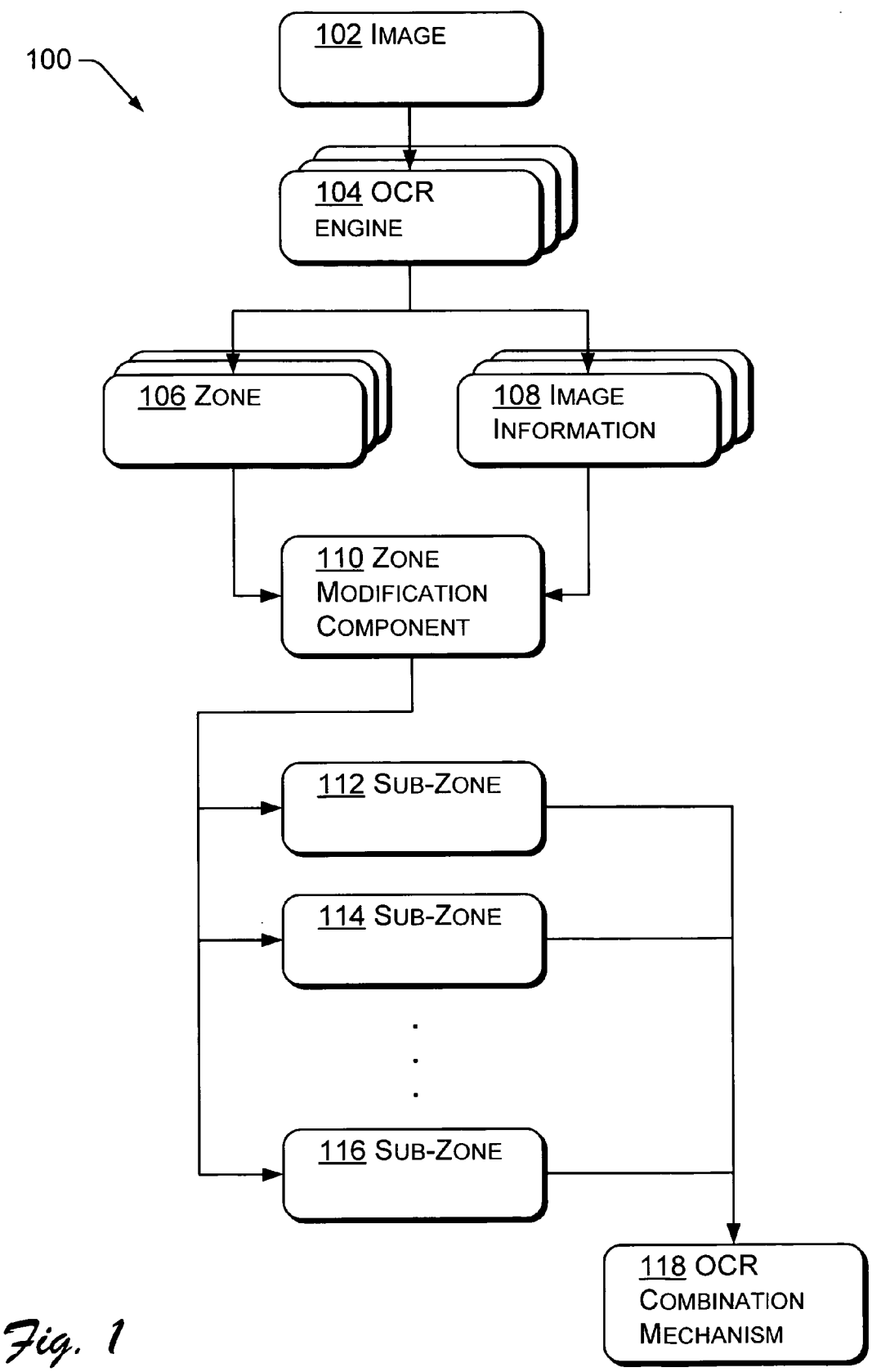
FIG. 1 is block diagram showing an example implementation of a document processing system configured to receive zone and image information and to produce sub-zones based on a consistent set of rules.

FIG. 1 is block diagram showing an example implementation of a document processing system 100 configured to receive zone and image information and to create 'normalized' sub-zones, i.e. sub-zones that are consistent with a set of zone-breaking factors or rules. In the implementation of FIG. 1, one or more pages of an input document are defined within an image 102. The image may be obtained by scanning a 'hard-copy' of the document, and may be configured in any format, such as PDF, that is desired. The image 102 may be processed by any type of information-extraction system, such as one or more engines 104. Note that the engines 104 can be segmentation engines. In many applications, segmentation engines are included within OCR engines. Accordingly, references to segmentation engines 104 could, in many applications, be interpreted as a reference to an OCR engine 104. The segmentation engines 104 extract one or more zones 106 and associated image information 108 from the image 102.

Figure 2:
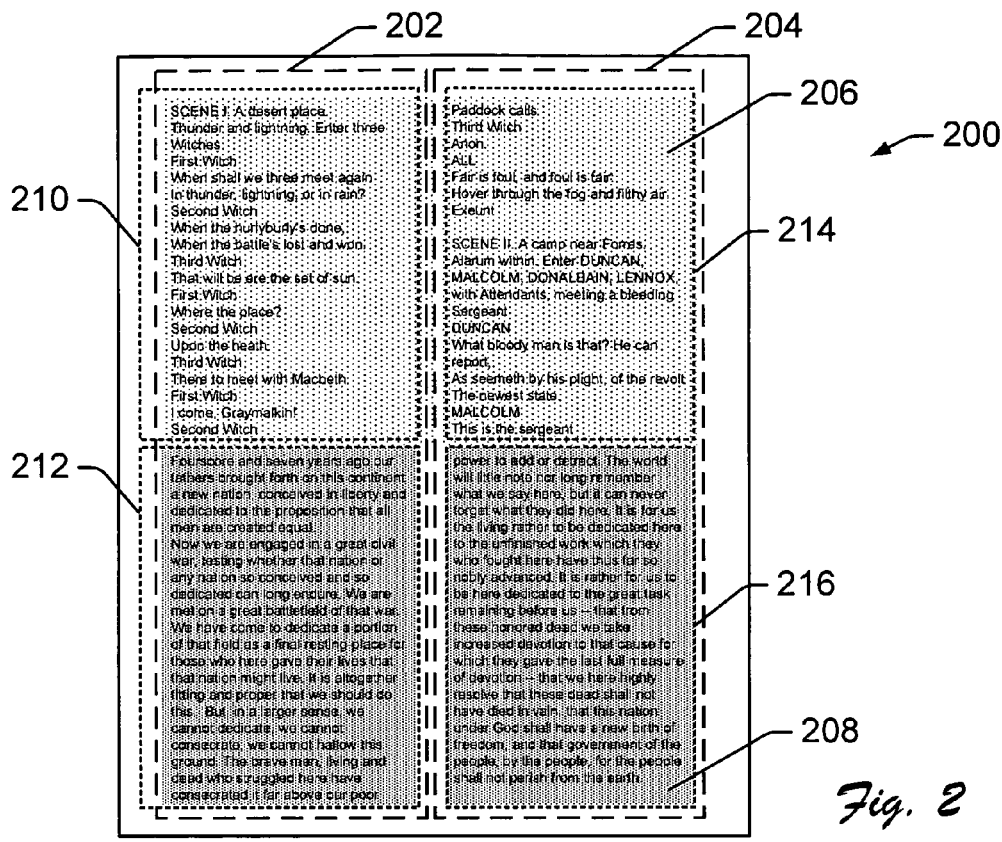
FIG. 2 shows an example of a page of a document wherein conventional document processing systems have created zones including the left and right columns, while the document processing system of FIG. 1 has created zones based on background color of the page.

Referring briefly to FIG. 2, examples of the zones 106, extracted by a typical segmentation engine 104, are seen. In particular, a page 200 of a document includes two zones 202, 204 (defined within the dashed lines) that are exemplary of the zones 106 created by many segmentation engines. The zones 202, 204 include text within columns on the left and right sides of the page, respectively. The zones 202, 204 are defective, since they fail to consider the background colors 206, 208 on the upper and lower portions of the page, respectively. Accordingly, zones 202, 204 include text from two articles within each of the two zones.

Referring again to FIG. 1, the image information 108 may be obtained from the segmentation engine 104. If the image information 108 is not created by the segmentation engine 104, if may be obtained (typically at greater cost) by operation of the zone modification component 110 on the image 102. The image information 108 typically includes data such as font type information, font size information, font style information (e.g. bold, italics, etc.), background color, and other factors.

A zone modification component 110 is configured to receive data, including definitions of one or more zones 106 and the image information 108, as input. The zone modification component 110 applies at least one zone-breaking factor to lines of text within the input zone 106. In particular, the zone modification component 110 evaluates each line within the zone 106 in a line-by-line manner with respect to one or more zone-breaking factors. If a preponderance of one or more zone-breaking factors indicates a break in the zone, the input zone 106 will be segmented prior to the current line, thereby creating an additional sub-zone starting with the current line. If the preponderance of the one or more zone-breaking factors indicates consistency between the current line and prior line(s), the current line will be added to the current output sub-zone. Accordingly, one or more sub-zones are created from each zone 106, wherein each line within each of the created sub-zones includes consecutive lines that share the same response to one or more zone-breaking factors.

Note that the zone modification component 110 typically applies a number of zone-breaking components, i.e. zone-breaking factors, to each line of text within the zone 106. In particular, a number of zone-breaking factors determine if a line from zone 106 should be added to the zone wherein the prior line was assigned (e.g. sub-zone 112) or should be used as the first line in a new zone (e.g. sub-zone 114). Accordingly, zone 106 may be broken into one or more (perhaps many) sub-zones 112-116. The number of sub-zones created depends on the interactions of the zone-breaking factors and the lines within the zone 106.

A number of zone-breaking factors can be incorporated into the zone modification component 110. A common zone-breaking factor involves font size. In particular, where a first line within a zone 106 has a first font size, and a second line within the zone 106 has a second font size, it is likely that the first line should conclude one sub-zone (e.g. sub-zone 112) and the second line should be used to start a new sub-zone (e.g. sub-zone 114).

A second common zone-breaking factor involves typeface (e.g. font). In particular, a difference in font between adjacent lines can be used to end one sub-zone and start another sub-zone. A third zone-breaking factor involves a change in background between two adjacent lines. For example, one line may have a first color of background, while a second line may have a second color of background. Such lines may be put into different sub-zones. A fourth example of a zone-breaking factor is a change in line spacing between two adjacent lines. For example, if line spacing has been 'single spaced' within one sub-zone, but a further line is 'double spaced' from the prior line, many embodiments of the zone modification component 110 would use the further line to start a new sub-zone, due to the difference in spacing. A fifth example of a zone-breaking factor involves a change in alignment of a line. For example, if lines within one sub-zone have been aligned directly below a prior line, a change in the alignment of a subsequent line may indicate that the line should be placed into a new sub-zone. More particularly, a shift from 'left justified' text to 'center justified' text could indicate the need to start a new sub-zone. A sixth example of a zone-breaking factor involves a change in the length of a line, with respect to prior lines within the same sub-zone. Such a change may indicate the need to end one sub-zone, and to start a new sub-zone.

Accordingly, a number of sub-zones 112-116, only three of which are shown for illustrative convenience, are created from one zone 106, depending on how the lines within the zone 106 respond to application of one or more zone-breaking factors. Note that one zone-breaking factor may be used exclusively to break the zone 106 into sub-zones 112-116. Alternatively, a plurality of zone-breaking factors (such as those described above, or others, easily envisioned) could be applied to each line within the zone 106. The zone modification component 110 can be configured to apply the zone-breaking factors according to a zone-breaking algorithm, wherein the results of the application of each zone-breaking factor could be taken into account in a decision to include a line of text in a first sub-zone, or to start a new sub-zone with the line of text.

In one implementation, a combination mechanism 118 (e.g. a 'voting mechanism or algorithm') can be configured to receive sub-zones 112-116 normalized according to the zone-breaking factors. The combination mechanism 118 is configured to resolve differences between the outputs of a plurality of different segmentation engines. For example, one or more OCR engines may disagree on the interpretation of a particular word, or one or more segmentation engines may disagree on how to segment a document. However, a voting algorithm within the voting or combination mechanism 118 can be utilized to resolve the disagreement. The voting mechanism may be as simple as deferring to the majority of the segmentation (or OCR) engines, or may be more complex—thereby utilizing the known strengths and avoiding the known weaknesses of individual segmentation engines. Notably, the voting algorithm functions more efficiently due to the normalization of the sub-zones according to the zone-breaking factors.

FIG. 2 shows an example of a page 200 of a document wherein an upper half of the page is a first color 206 and a lower half of the page is a second color 208. The intent of the authors and editors was that the upper half of the page is associated with a first article, while the lower half of the page is associated with a second article. However, conventional document page analysis results in first and second zones 202, 204, respectively, as shown by the dashed line perimeters. This is typical of the output of a segmentation engine (e.g. segmentation engine 104 of FIG. 1). The first zone 202 comprises the entire left side of the page (including areas of each of the two colors and portions of both articles). Similarly, the second zone 204 comprises the entire right side of the page (including areas of each of the two colors and portions of both articles). Accordingly, conventional document page analysis would result in zones containing portions of different articles, thereby resulting in errors requiring manual intervention to correct.

FIG. 2 shows how the zone modification component 110 (of FIG. 1) configures the page 200 according to one or more of the zone-breaking factors described above. In particular, where the zone 202 is used as input (analogous to zone 106 of FIG. 1) to the zone modification component 110, the third zone-breaking factor described above considers the background color of adjacent lines. Accordingly, the zone 202 provided by the segmentation engine 104 (FIG. 1) is segmented by the zone modification component 110 into an upper sub-zone 210 and a lower sub-zone 212, shown for purposes of illustration by dotted perimeter lines. The upper zone 210 includes the first background color 206 and a lower zone 212 having the second background color 208. Similarly, the zone modification component 110 segments the zone 204 into two sub-zones 214 and 216.

Figure 3:
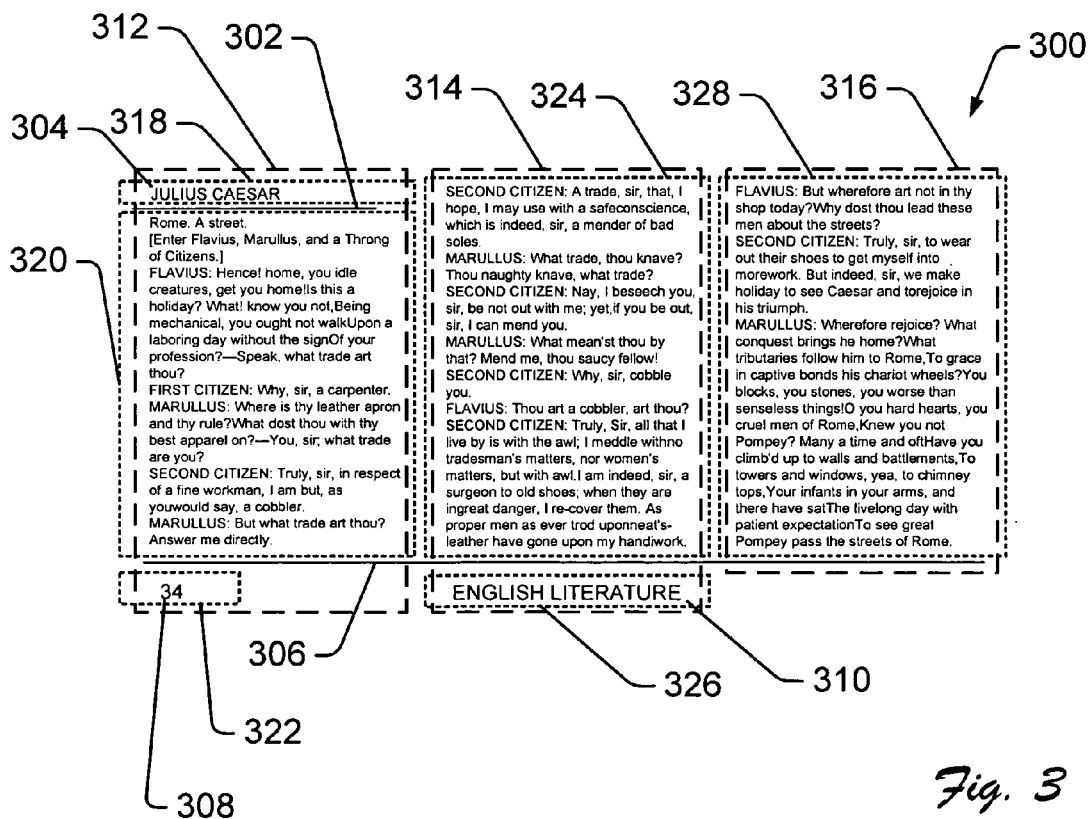
FIG. 3 shows an example of a portion of a document wherein conventional document processing systems have created zones without regard to fine lines dividing portions of the text, while the document processing system of FIG. 1 has created zones based in part on the fine lines.

FIG. 3 shows an example of a lower portion 300 of a page within a document wherein a first thin line 302 separates a title 304 of an article, and wherein a second thin line 306 separates the article from a "footer" that includes a page number 308 and the phrase "English Literature" 310. A segmentation engine (e.g. engine 104 of FIG. 1) has segmented the portion 300 of the document into left, center and right zones 312, 314 and 316, respectively, as shown by the dashed line perimeters. This is typical of the output of a segmentation engine, and creates problems for many document-processing functions, such as extracting an article from the document. In particular, the left zone 312 comprises the title of the article 304, a portion of the article and the page number 308, which is not part of the article. Similarly, the center zone 314 comprises both the center column of the article and the "footer," which is not part of the article. Accordingly, conventional document page analysis would result in zones containing unwanted text, thereby resulting in errors requiring manual intervention to correct.

FIG. 3 shows how the zone modification component 110 (of FIG. 1) configures the portion 300 of the document according to one or more of the zone-breaking factors described above. Thus, the zone modification component 110 is configured to receive the zone 312 as input, in a manner analogous to zone 106 of FIG. 1. Having received the input, the zone modification component 110 is configured to apply several zone-breaking factors to create three sub-zones. In particular, a sub-zone 318 containing text comprising the title of the article, a sub-zone 320 comprising the first column of text of the article, and a sub-zone 322 comprising the page number are created. In creating the above-noted sub-zones, the zone modification component 110 will probably consider zone-breaking factors such as changes in line spacing, observation of the narrow lines 302, 306, changes in text line positioning, changes in font size and changes in font. Because the sub-zones 318-328 each include more homogeneous text than the original zones 312, 314, 316, less manual intervention will be required during document analysis functions, such as article extraction.

Figure 4:
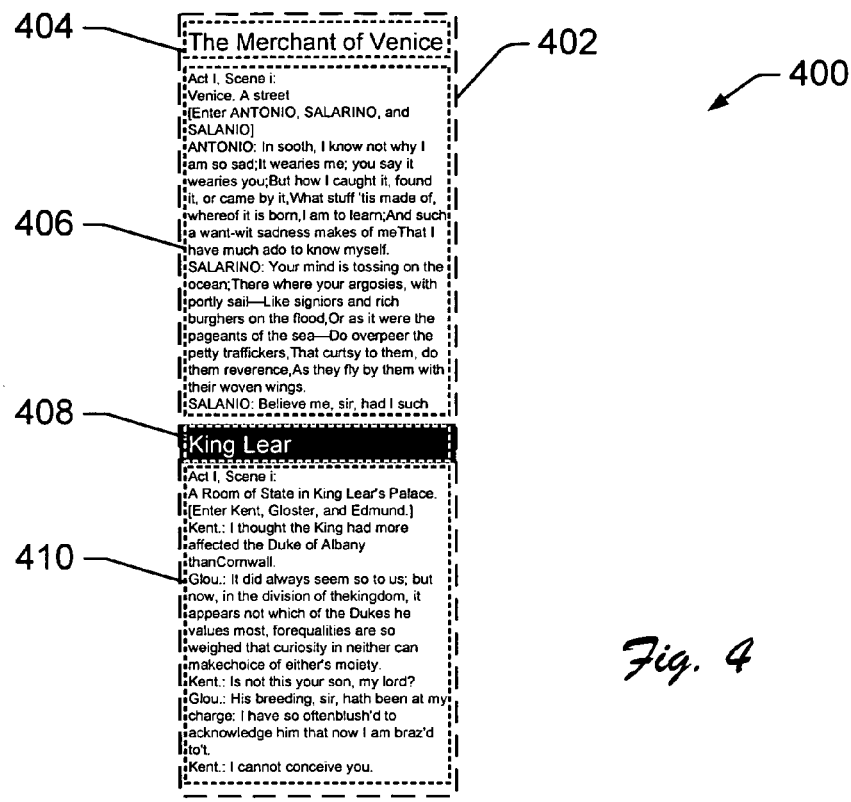
FIG. 4 shows an example of a portion of a document wherein conventional document processing systems have created a zone based on co-location of text within a single column, while the document processing system of FIG. 1 has created a plurality of zones based in part on more detailed rules.

FIG. 4 shows an example of a portion 400 of a document wherein conventional document processing systems (e.g. a segmentation engine 104 of FIG. 1) have created a single zone 402 based on co-location of text within a single column. The single zone 402, shown by a dashed perimeter line, includes all or part of two articles, each having a title and an area of text. The second article includes a title having distinctive background color. The zone 402, as well as aspects of that zone, such as the background color of the second title, the fonts used, the font sizes, etc., are provided by the segmentation engine 104 as image information 108 to the zone modification component 110. Using the zone 402 and image information as input, the zone modification component 110 creates sub-zones 404-410, shown by dotted perimeter lines. Each sub-zone 404-410 is created from a consensus reached after application of one or more zone-breaking factors, such as font type, font size, lines spacing, background and others. Thus, while one zone-breaking factor can be determinative, it is not necessarily so.

Figure 5:
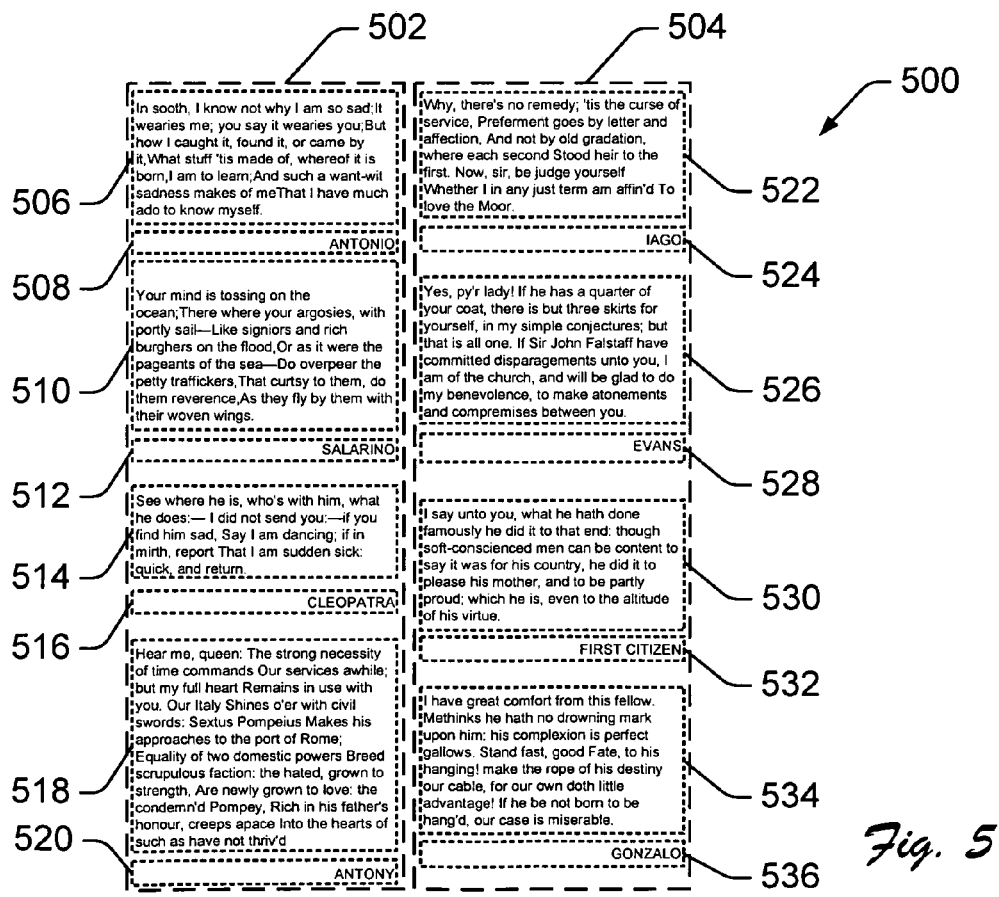
FIG. 5 shows an example of a portion of a document wherein conventional document processing systems have created two zones, each based on a single column of text, while the document processing system of FIG. 1 has created a plurality of zones based in part on more detailed rules.

FIG. 5 shows an example of a portion 500 of a document wherein conventional document processing systems have created two zones 502, 504, each based on a single column of text. Each of the zones 502, 504 include a number of "letters to the editor." Because each zone includes more than one such letter, extraction of the letters is made more difficult. Accordingly, the zone modification component 110 (FIG. 1) segments the zones 502, 504 into a plurality of sub-zones 506-536 by applying one or more zone-breaking factors to each line within the zones 502, 504. For example, zone-breaking factors such as line spacing and line orientation or justification (e.g. 'left justification' or 'right justification' or how far to the left the line starts and how far to the right the line ends) are used to segment the zones 502, 504 into sub-zones 506-536.

Figure 6:
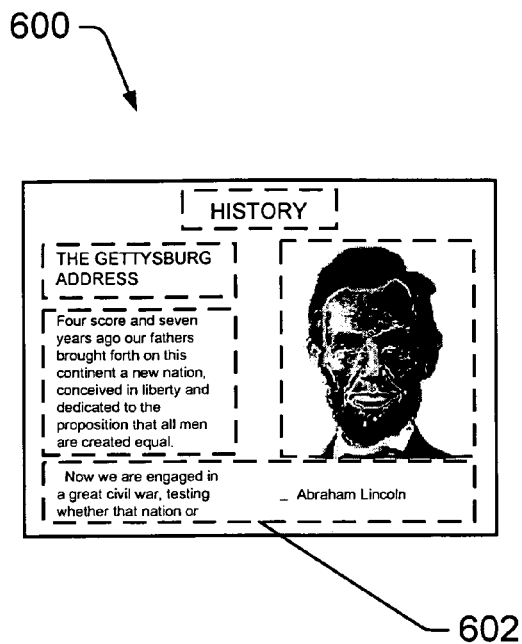
FIG. 6 shows an error in defining a zone that is commonly made by conventional document processing systems.
Figure 7:
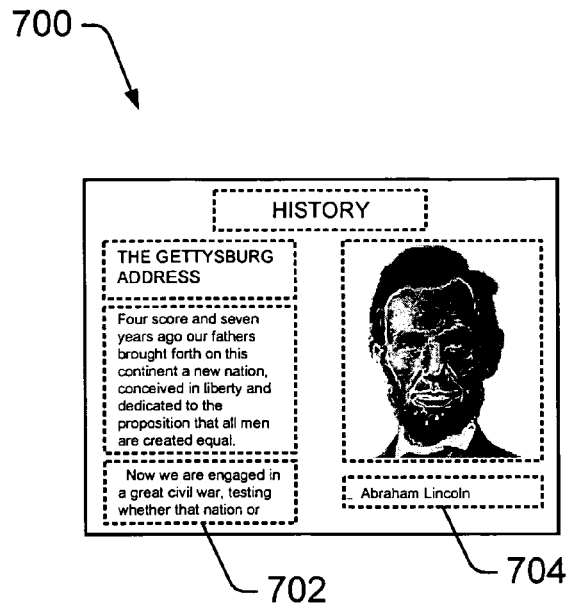
FIG. 7 shows, in contrast to FIG. 6, correct output created by the system of FIG. 1.

FIG. 6 shows a portion 600 of a document that illustrates an error in defining a zone that is commonly made by conventional document processing systems, such as the segmentation engine 104 of FIG. 1. In particular, the zone 602 includes text that should be included within two zones. In contrast, FIG. 7 shows a corrected portion 700 of the document that illustrates a result of processing the zone 602 (seen in FIG. 6) by a zone modification component 110 (FIG. 1). In particular, the sub-zones 702, 704 have been created by the zone modification component from input including the zone 602 (FIG. 6). The sub-zones 702, 704 are created by zone-breaking factors such as a line length factor, a line alignment factor and/or other zone-breaking factors that recognize that the text "Abraham Lincoln" is not part of the Gettysburg Address, to the left.

Figure 8:
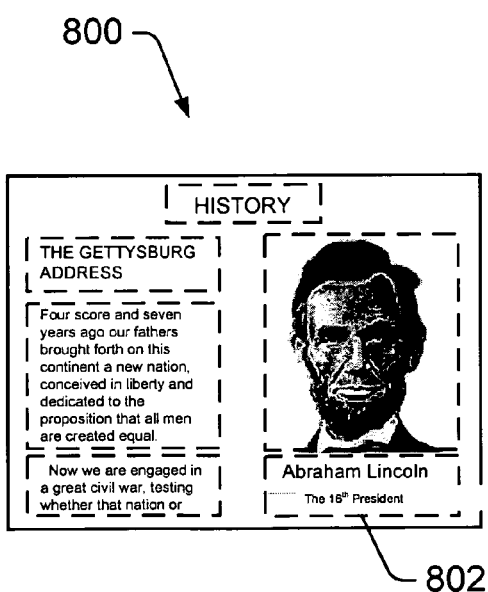
FIG. 8 shows an error in defining a zone that is commonly made by conventional document processing systems.
Figure 9:
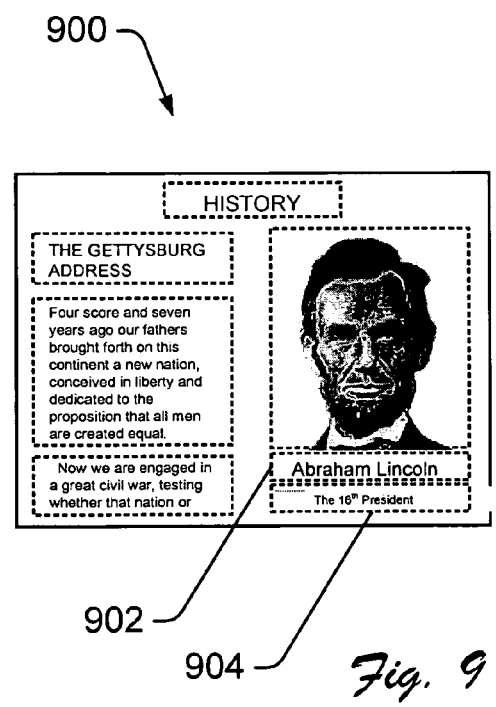
FIG. 9 shows, in contrast to FIG. 8, correct output created by the system of FIG. 1.

FIG. 8 shows a portion 800 of a document having zones created by a portion of a document processing system, such as the segmentation engine 104 of FIG. 1. The segmentation engine 104 erroneously created the zone 802, which includes text that is distinguished at least by font size and line alignment. Accordingly, FIG. 9 shows a portion 900 of a document having sub-zones created by the zone modification component 110 of FIG. 1. In particular, the zone modification component 110 has segmented the input zone 802 to create two sub-zones 902, 904 based on zone-breaking factors such as font size and line alignment. Because the sub-zone include text which is more homogeneous, later stages of document processing (e.g. article extraction) can be more accurately performed.

Figure 10:
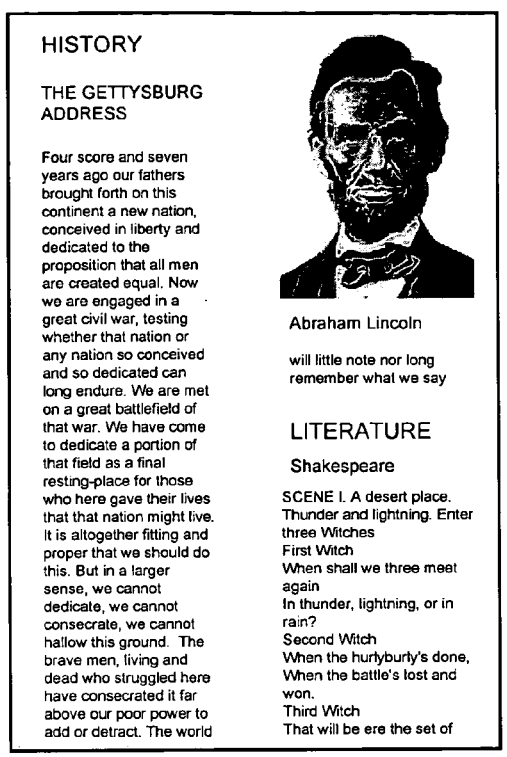
Figure 11:
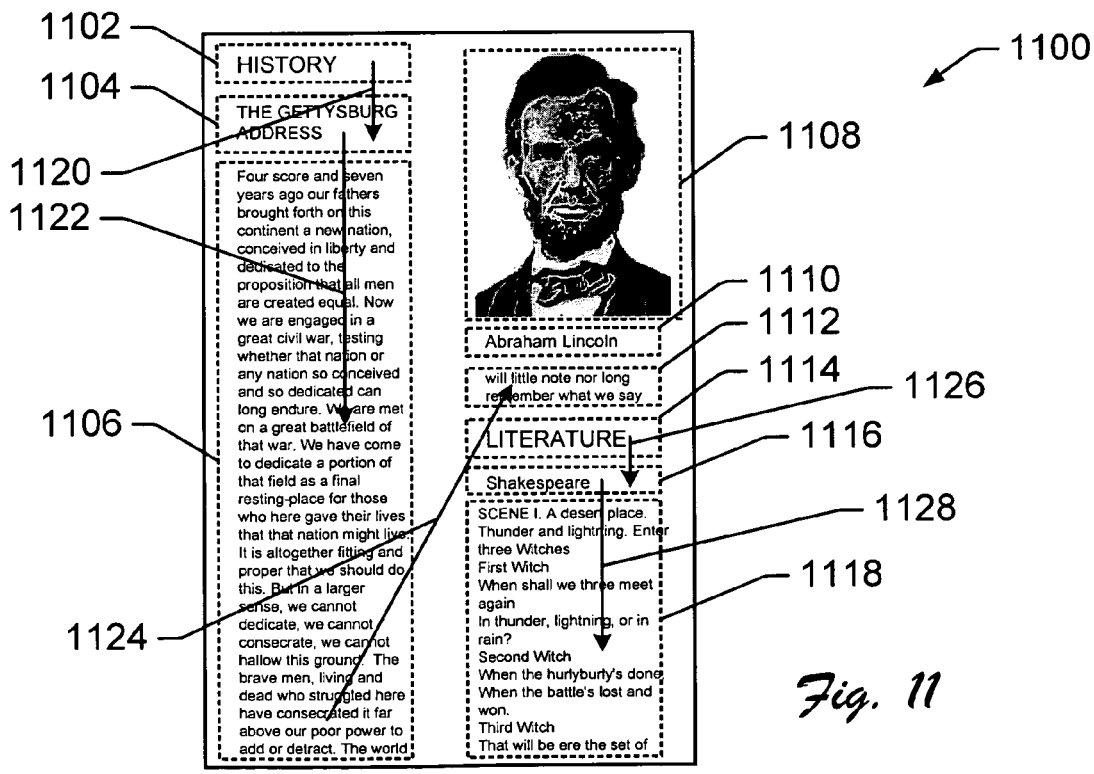

FIGS. 10 and 11 illustrate diagrams representing input and output, respectively, of a document processing system (e.g. document processing system 100 of FIG. 1). In the example of FIG. 1, the document processing system 100 includes an input image 102, a representative example 1000 of which is seen in FIG. 10. The document processing system 100 of FIG. 1 produces a plurality of sub-zones 112-116 as output, which are shown in the example of FIG. 11 by sub-zones 1102-1118. The text lines of each sub-zone are distinguished from adjacent text lines within adjacent sub-zones by zone-breaking factors, such as font size and line placement. Additionally, a reading order is defined by arrows 1120-1128. The reading order defines a likely order by which a reader would read the sub-zones 1102-1118. This is an aspect of article extraction, i.e. a process by which an article is extracted from a document, which will be addressed in greater detail infra.

Figure 12A:
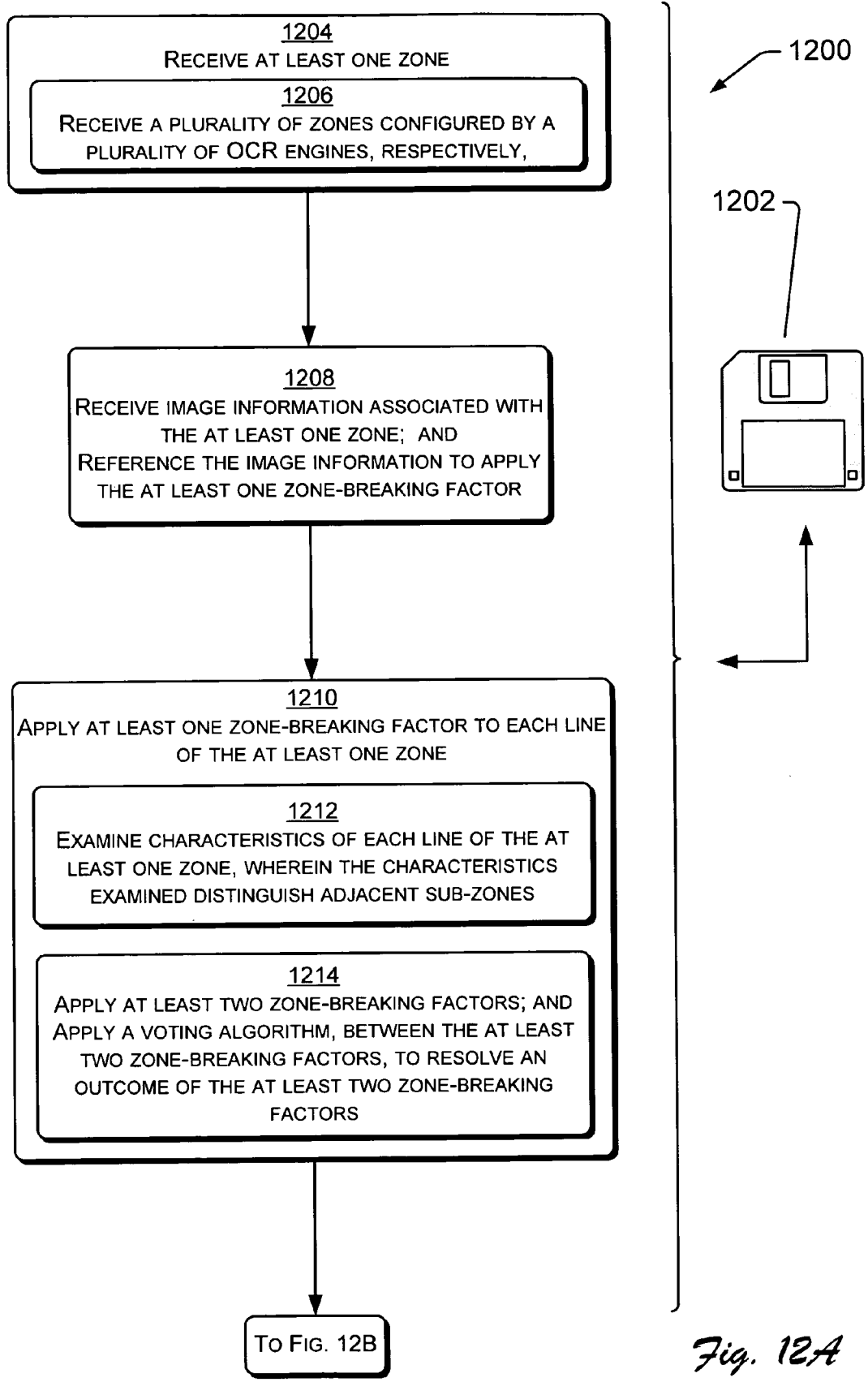
FIGS. 12-13 show example implementations of the operation of the document processing system of FIG. 1.
Figure 12B:
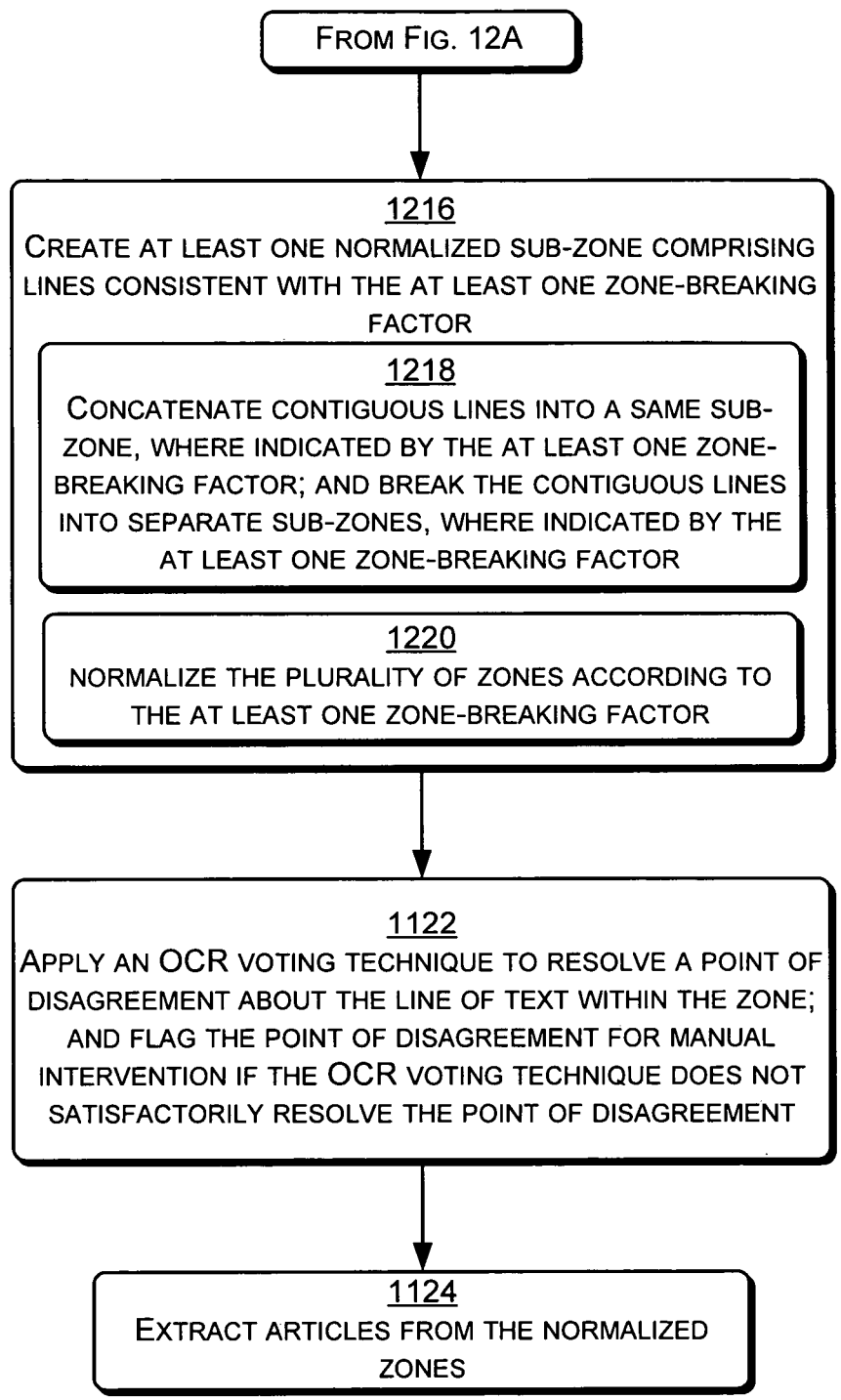

FIG. 12 shows an example embodiment 1200 of the operation of the document processing system 100 of FIG. 1, wherein an input zone is segmented and normalized. The embodiment 1200 may be performed by any desired method, such as by implementation on a computer readable media 1202, containing computer-executable instructions consistent with the embodiment 1200. At block 1204, at least one zone is received. In the example of FIG. 1, a zone 106 is received by a zone modification component 110. The zone 106, together with image information 108 such as font type, font size, line spacing, etc. is produced by a component, such as segmentation engine 104 from an image 102, which may have been scanned from a 'hard copy' of a document. In the more specific example of block 1206, the receiving of block 1204 includes receiving a plurality of zones configured by a plurality of segmentation engines, respectively. While FIG. 1 shows only one segmentation engine 104 for reasons of illustrative clarity, that segmentation engine can be representative of a plurality of segmentation engines (and/or OCR engines). Accordingly, the zone modification component 110 of FIG. 1 can be configured to receive zones from a plurality of segmentation engines (OCR engines, or other zone-generating components) and to apply a normalizing standard based on the zone-breaking factors to create sub-zones from the received plurality of zones.

At block 1208, image information associated with the at least one zone is received, and the image information is referenced to apply the at least one zone-breaking factor. In the example of FIG. 1, the image information 108 may include such aspects as font type, font size, font style (e.g. bold, italics, etc.), background color and other aspects. By referencing the image information, zone-breaking factors may be selected that will allow the zone modification component 110 to break zones and to correctly assemble the sub-zones 112-116. For example, if background color image information is available, then applying a zone-breaking factor related to background color would be advantageous when determining if a line of text belongs in a current sub-zone, or should be assigned to the next sub-zone.

At block 1210, at least one zone-breaking factor is applied to each line of the at least one zone (received at block 1204). In the example of FIG. 1, the zone-breaking factors are applied by the zone modification component 110. Example aspects of the application of the at least one zone-breaking factor are seen in blocks 1212-1214. At block 1212, characteristics of each line of the at least one zone are examined. The characteristics that are examined include characteristics that distinguish adjacent sub-zones. For example, one sub-zone may be associated with a background of a first color or fonts of a first size, while an adjacent sub-zone may be associated with a background of a second color or fonts of a second size. Thus, the examination reveals which lines should be concatenated to the current sub-zone, and which lines should be used to start a subsequent sub-zone. In one implementation seen at block 1214, at least two zone-breaking factors are applied to each line of the zone. The results of the at least two zone-breaking factors are input to a combination algorithm (which in some applications is a voting algorithm), thereby resolving the output of the factors. For example, if one or more of the zone-breaking factors indicates that the line in question should be included within the current sub-zone, but other zone-breaking factors disagree, the voting algorithm would resolve the issue, and assign the line in question to a current sub-zone or to a subsequent sub-zone.

At block 1216, at least one normalized sub-zone is created by the zone-breaking factors applied at block 1210. The normalized zone includes lines consistent with the at least one zone-breaking factor. For greater accuracy in forming the normalized sub-zone, a greater number of zone-breaking factors can be applied, and the voting algorithm of block 1214 applied. Detail of the formulation of the normalized sub-zone is seen in blocks 1218-1220. At block 1218, contiguous lines are concatenated into a same sub-zone, where indicated by the at least one zone-breaking factor. Conversely, adjacent lines of text are broken into separate sub-zones where indicated by the at least one zone-breaking factor. For example, in FIG. 5, the sub-zones 506 and 508 are formed because a zone-breaking factor related to line location realized that the sub-zone 506 is left-justified, while the sub-zone 508 is right-justified. At block 1220, in an embodiment wherein a plurality of zones are available (e.g. the embodiment of block 1206) they are normalized according to the at least one zone-breaking factor.

At block 1222, in some implementations, zones are generated by more than one zone-generating component, such as more than one segmentation engine 104 (FIG. 1). Where more than one segmentation engine generates zones, the normalizing standard is applied to the more than one zone. Once normalized, a voting technique may be applied to text within the normalized zone. For example, a voting technique may be applied to resolve a point of disagreement about the line of text within the zone. Additionally, the point of disagreement may be flagged for manual intervention if the voting technique does not satisfactorily resolve the point of disagreement.

Having a plurality of zones normalized according to desired zone-breaking factors has several advantages. For example, block 1224 shows normalized zones may be used by a voting mechanism, thereby more accurately evaluating text within the zones. In an environment wherein a plurality of articles is included within a document (e.g. the document from which image 102 (FIG. 1) was obtained) articles may be extracted from the normalized zones more efficiently than if the zones were not normalized.

Figure 13:
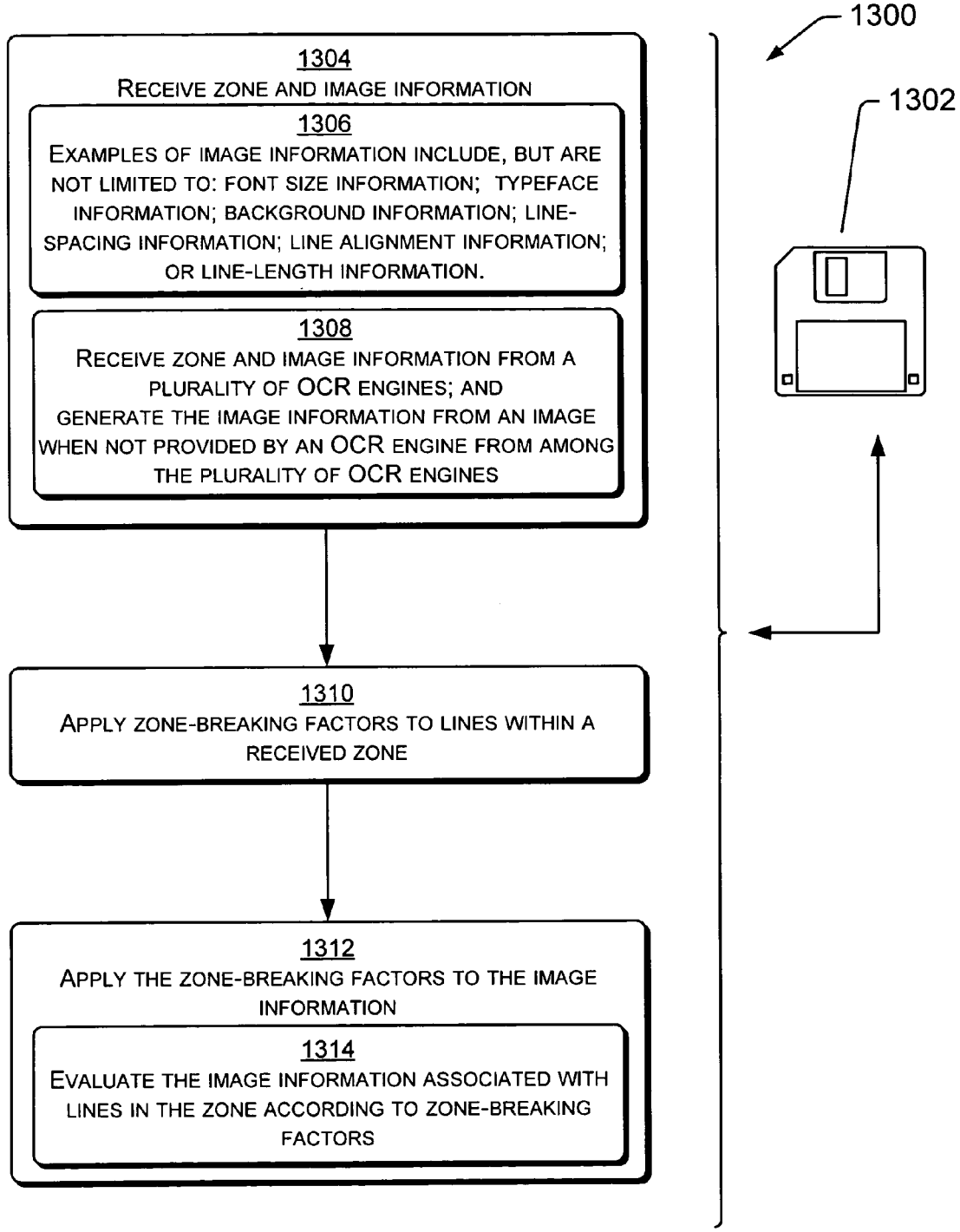

FIG. 13 shows a further example embodiment 1300 of the operation of the document processing system. The embodiment 1300 may be performed by any desired method, such as by implementation on a computer readable media 1302, containing computer-executable instructions consistent with the embodiment 1300. At block 1304, zone and image information are received. Referring again to FIG. 1, the zone modification component 110 receives zone 106 and image information 108. Blocks 1306 and 1308 include examples of possible implantations of block 1304. Block 1306 discloses examples of the image information that may be received by the zone modification component 110. While image information could be of almost any form, font size information, typeface (font) information, background information (e.g. color), line spacing information (e.g. single-spaced, double-spaced), line alignment information (e.g. left justified, center justified) or line length information could all be supplied. At block 1308, zone and image information is received from a plurality of segmentation engines. When not provided, the image information may be generated from an image by the zone modification component or other tool. In the example of FIG. 1, the zone 106 and image information 108 are created by a segmentation engine 104 scanning the image 102. However, the information 106, 108 could be generated by the zone modification component 110 (or other tool), if not provided by the segmentation engine 104.

At block 1310, the zone-breaking factors are applied to lines of a received zone. By applying the zone-breaking factors, the received zone is normalized. Referring briefly to FIG. 1, the sub-zones 112-116 are consider to be normalized with respect to zone-breaking factors applied by the zone modification component 110.

At block 1312, zone-breaking factors are applied to the image information. In the example of FIG. 1, zone-breaking factors are applied by the zone modification component 110, and the image information 108 is supplied by the segmentation engine 104. Block 1312 may be implemented according to the example of block 1314, wherein the image information associated with lines in the zone is evaluated. For example, if the image information includes background information, then a zone-breaking factor configured to examine background information could be utilized. Similarly, if the image information includes font size, then a zone-breaking factor utilizing font size could be utilized.

A variation of block 1314 is possible. In particular, zone-breaking factors may be applied by comparing the line of text from an input zone (e.g. zone 106 of FIG. 1) to at least one prior line of text within that zone. Additionally, a comparison can be made of aspects derived from image information (e.g. image information 106 of FIG. 1) associated with the line of text from the zone to aspects derived from image information associated with at least one prior line of text within that zone.

Figure 14:
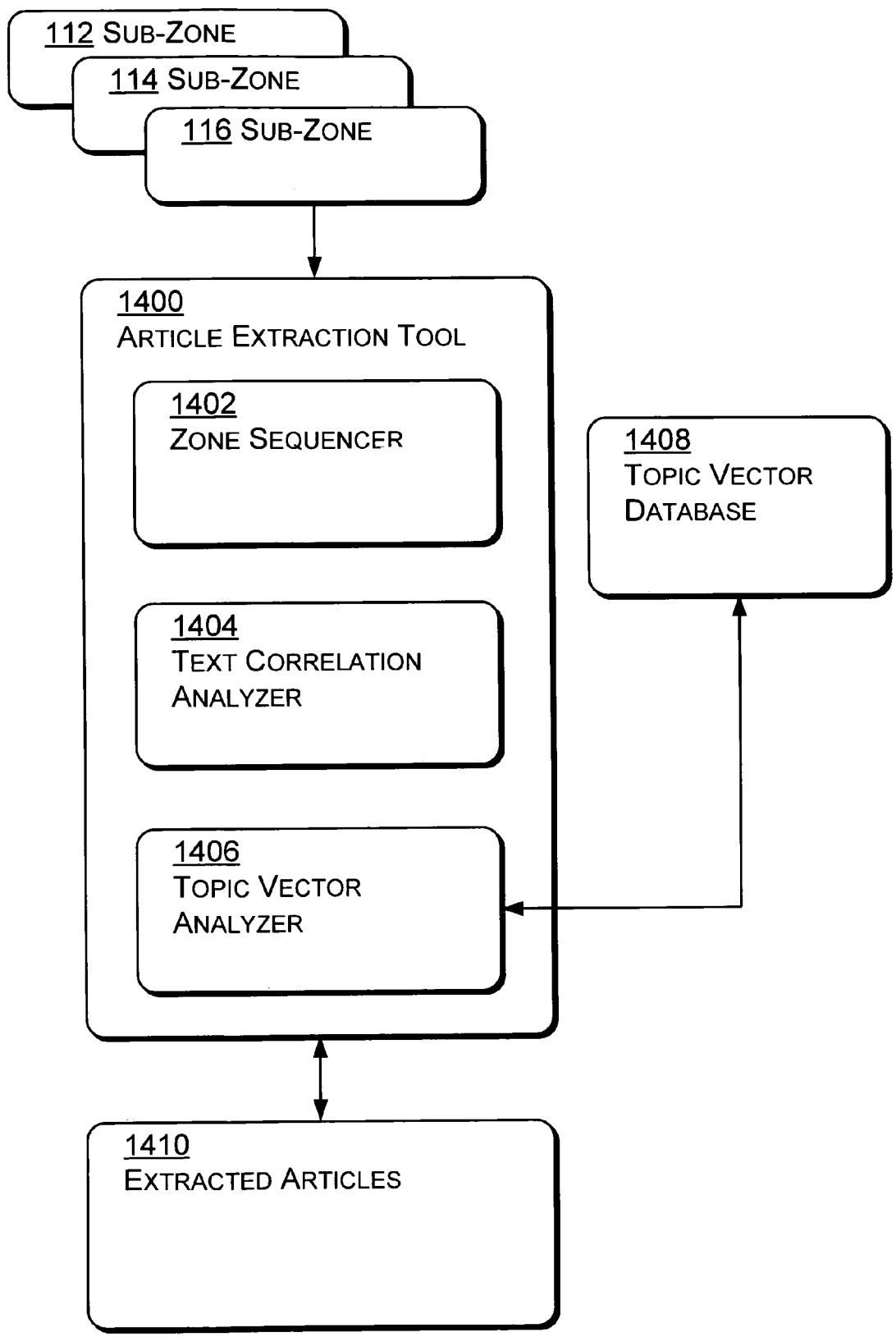
FIG. 14 is block diagram showing an example implementation of a document processing system configured to extract articles from an input document.

FIG. 14 shows a block diagram illustrating an article extraction tool 1400 configured to extract articles from an input document. In one embodiment, the input document is preferably configured according to zones 1402. The zones may be created by one or more segmentation engines, such as the zones 106 created by segmentation engines (and/or OCR engines) 104 of FIG. 1. However, in a preferred embodiment, the input zones 1402 are normalized sub-zones, such as sub-zones 112-116 of FIG. 1.

In the example of FIG. 14, the article extraction tool 1400 includes a zone sequencer 1402. The zone sequencer 1402 is configured to address an early step in article extraction, i.e. the zone sequencer is configured to detect a set of likely "reading orders" of the zones (which typically comprise a page of a document). The reading orders translate into zone sequences that can potentially constitute article threads. Referring back to FIG. 11, to legal reading orders of the first article are shown by arrows 1120-1128. In an alternative reading order, the sub-zone 1110 could be included between sub-zones 1106 and 1112. Starting with the most likely reading orders, the article extraction tool 1400 selects the most likely reading order, and analyzes that order to determine the most likely place to break the reading order to confine each article within a segment of the segmented reading order. For example, in FIG. 1 the major ambiguities include determining whether zone 1110 is part of an article, and determining where, within the reading order, the articles start and end. Many heuristics can be used to accomplish that goal, including column-based layout analysis, zone spacing, font analysis, punctuation and presentation, etc.

Accordingly, the zone sequencer 1402 is configured to detect a reading order of zones within a page of the document, typically using 'rules,' such as reading left-to-right and top-to-bottom. Accordingly, the zone sequencer 1402 may detect more than one reading order of the zones within the page of the document, and having done so, will determine which of the more than one reading order is most likely to be correct.

In the example of FIG. 14, the article extraction tool 1400 includes a text correlation analyzer 1404. The text correlation analyzer 1404 is configured to consider text similarity of adjacent zone pairs in the reading order. By considering the pairs, the text correlation analyzer 1404 classifies each pair as a split pair, a candidate joined pair, or a joined pair. The classification is based on text correlation, i.e. a degree to which the adjacent zones use same or similar vocabulary. In particular, a split pair includes two zones wherein the zones exhibit less than a first threshold level of text similarity. Candidate joined zone pairs exhibit greater than the first threshold level of similarity, but do not use text that is sufficiently similar to indicate that the pair are a joined pair. Joined zone pairs exhibit greater than a second threshold level of similarity, typically in terms of their use of vocabulary.

In one implementation, the text correlation analyzer 1404 is configured to evaluate text within the adjacent zone pairs for mutual inclusion of same or similar words and to establish a numerical value of correlation for each pair of adjacent zones based on the evaluation. Where desired, a numerical value for correlation for each pair zones within the page of the document may be established. For example, if four (4) zones are present, two likely reading orders may be recognized by the zone sequencer 1402, e.g. {1, 2, 3, 4} and {1, 3, 2, 4}. Accordingly, the text correlation analyzer 1404 will evaluate all possible pairs to determine a likelihood of the pair being in the same article. This can be summarized in the following table, wherein the correlation is typically measured as a function of shared vocabulary:

TABLE 1

| Zone pair | Correlation |
|---|---|
| [1, 2] | 0.1758 |
| [1, 3] | 0.0058 |
| [1, 4] | 0.0074 |
| [2, 3] | 0.0836 |
| [2, 4] | 0.0093 |
| [3, 4] | 0.1822 |

In the table above, we can see that the zones pairs [1, 2] and [3,4] are strongly correlated, at 17.58% and 18.22%, respectively. Conversely, zone pairs [1,3], [1,4] and [2,4] are weakly correlated at less than 1%, and should be considered 'split pairs.' The zone pair [2,3] is intermediate, and may be considered a 'candidate split zone pair.' Under one correlation scheme, two zones are 100% correlated if all words in both zones are the same, and 0% correlated if the two zones share no words in common. Algorithms can easily be configured for any application to correlate any two zones between these extremes.

Applying the two likely sequences, {1, 2, 3, 4} and {1, 3, 2, 4}, results in the below two tables. Note that the decision to define each zone pair as "joined," "candidate joined" or "split," (third column) typically involves threshold values. That is, if a zone pair's correlation value is below a first threshold value (e.g. 5%), then the zone pair is defined as split. If the correlation exceeds the first threshold, the zone pair is a candidate joined pair. If the correlation exceeds a second, higher, threshold (e.g. 15%), the zone pair is a joined pair.

TABLE 2

| Sequence 1 | Correlation | Join? |
|---|---|---|
| [1, 2] | 17.58% | Join |
| [2, 3] | 8.36% | Candidate split |
| [3, 4] | 18.22% | Join |

TABLE 3

| Sequence 2 | Correlation | Join? |
|---|---|---|
| [1, 3] | 0.58% | Split |
| [3, 2] | 8.36% | Candidate split |
| [2, 4] | 0.93% | Split |

Accordingly, the output of the text correlation analyzer 1404 includes information as represented by the above two tables. Each table is associated with one of the plausible reading sequences, which was output from the zone sequencer 1402. The tables indicate that one or more pair of zones should be joined (i.e. are probably part of the same article), indicate that one or more pair of zones are split candidates (may or may not be joined), and indicates that one or more pair of zones are split (i.e. are not part of the same article). At this point, the candidate split zone pairs should be analyzed, to determine if the associated zones should be joined or split.

The topic vector analyzer 1406 obtains a topic vector for each of the zones within each of the candidate split pairs. Having obtained a topic vector for each zone within each pair of zones, a distance between the topic vectors may be easily calculated. Where the distance between the topic vectors of the zones within any candidate pair exceeds a threshold distance, the candidate split pair is split. Where the distance between each zone's topic vector is less than the threshold distance, the pair is joined.

The topic vector analyzer 1406 consults a topic vector database 1408. The topic vector database may be considered to be off-line in the sense that it utilizes a wealth of data that is unrelated to the document currently being processed by the article extraction tool 1400. The input to the topic vector analyzer 1406 in the above example would be zones 2 and 3, since these zones are paired by both of the plausible reading orders as 'candidate splits.' (Note that the order of the zone pair, e.g. [2,3] or [3,2] is not relevant.) In operation, the topic vector analyzer 1406 evaluates text within two or more zones and obtains a topic vector for each zone. The topic vectors are obtained using the topic vector database 1408. The topic vector analyzer 1406 may obtain more than one topic vector for each zone. For example, the topic vector for a given zone may be:

Zone 2: {politics: 0.981; government: 0.119; crime: 0.089}
Zone 3: {science: 0.871; engineering: 0.539}

The topic vector distance between zone 2 and zone 3 of Tables 2 and 3 may be found to be, for example, 1.9, which may exceed a threshold. Because the topic vector difference exceeds the threshold, it is likely that the topics contained within the zones 2 and 3 are different, and therefore not part of the same article. Accordingly, the candidate split zone pair, zones 2 and 3, are split. Therefore, if the first reading order (Sequence 1) is correct, then zones 1 and 2 comprise a first article, while zones 3 and 4 comprise a second article. If the second reading order (Sequence 2) is correct, then each zone is an independent article. Conventional or heuristic algorithms may be able to determine which reading order is correct; however, manual intervention may be required. Using this information, the articles 1410 are output from the article extraction tool 1400.

Figure 15:
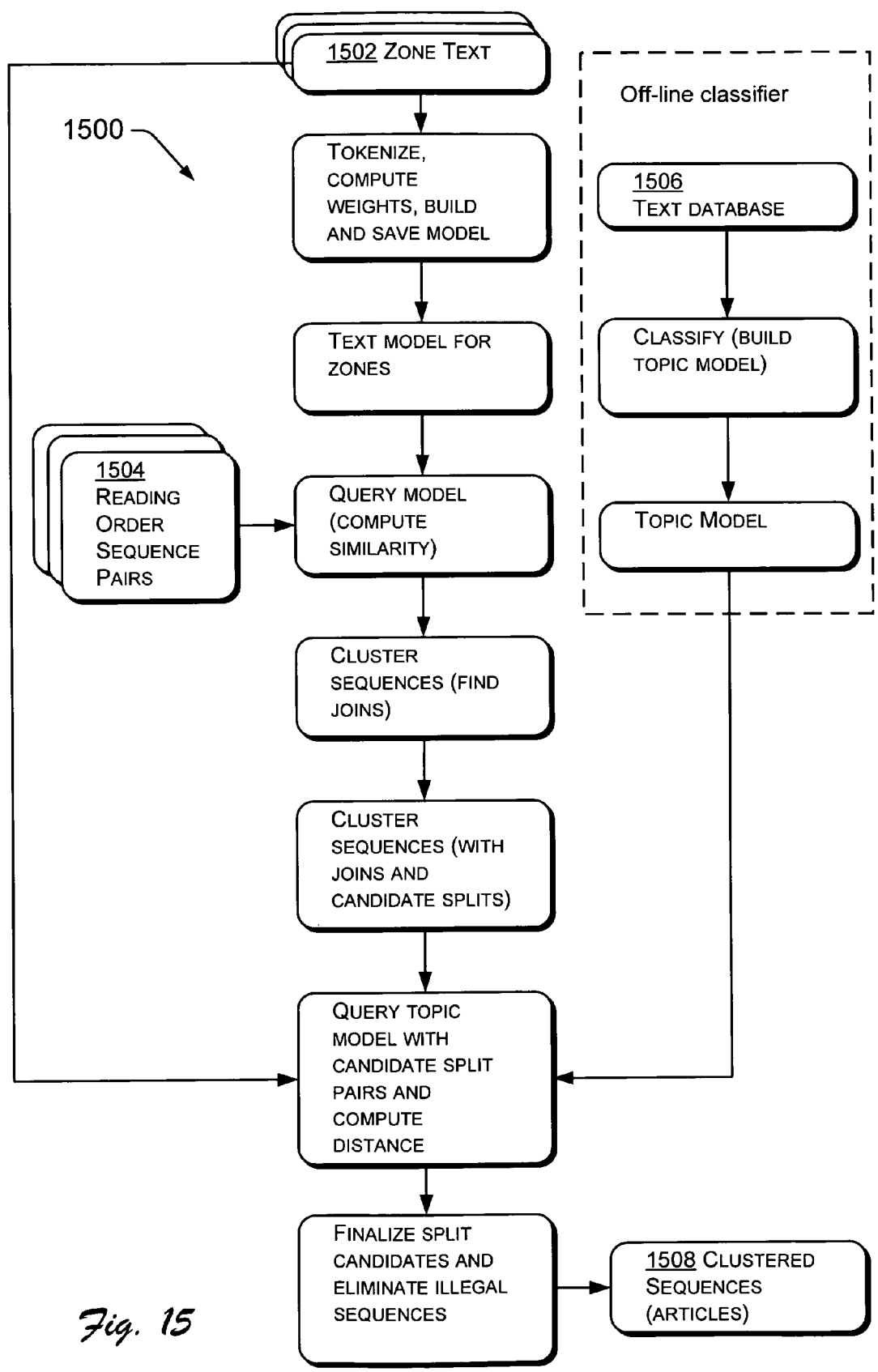
FIG. 15 is block diagram showing a second example implementation of a document processing system configured to extract articles from an input document.

FIG. 15 is block diagram showing a second example implementation 1500 of a document processing system configured to extract articles from an input document. The functionality of implementation 1500 is similar to implementation 1400; however, the architecture is differently configured for purposes of discussion and example. The article extraction process starts with a collection of text zones 1502 and a set of reading order sequence zone pairs 1504. The reading order sequences zone pairs 1504 include pairs of zones that are adjacent within the reading order sequence. For example, if one of the reading orders was zone 1, followed by zone 2, followed by zone 3, then the reading order sequence zone pairs 1504 would include two zone pairs, i.e. [1,2] and [2,3]. Note that the text zones 1502 could be generated by the segmentation engines 104 of FIG. 1. That is, the text zones 1502 could be analogous to zones 106. More preferably, however, the zones 1502 would be analogous to the normalized sub-zones 112-116 of FIG. 1, since the normalized sub-zones are more efficiently processed by the implementation 1500. The text correlation analyzer (seen in FIG. 14 as 1404, and seen in FIG. 15 having functionality distributed among a plurality of blocks), after building a model from the text zones, queries the model with each zone and ranks zone pairs by similarity. Similar zone pairs within a candidate sequence are marked as joined pairs. Zone pairs with low similarity are marked as split pairs. Zone pairs with intermediate similarity are marked as split candidates. The list of split candidates is then fed to the topic vector analyzer (seen in FIG. 14 as 1406, and seen in FIG. 15 having functionality distributed among a plurality of blocks). The topic vector analyzer uses a model 1506 that was computed off-line by using another text database (for example, other information sources, newspapers or previously captured data from the same collection). Each of the 'split candidates' previously obtained is ranked by topic-vector distance, and marked as a definite split if the distance exceeds a threshold value. At the end of the process, the candidate sequences are clustered in such a way that each cluster should represent a separate article. Zones belonging to the same cluster are joined with article links and this information is passed to the rest of the document-processing pipeline. Additionally, the same procedure can be extended for application to detect scattered zones forming an article across adjacent pages, and even over an entire magazine or other document. This is particularly useful to increase the confidence and detect articles that are split over multiple, non-consecutive pages.

Figure 16A:
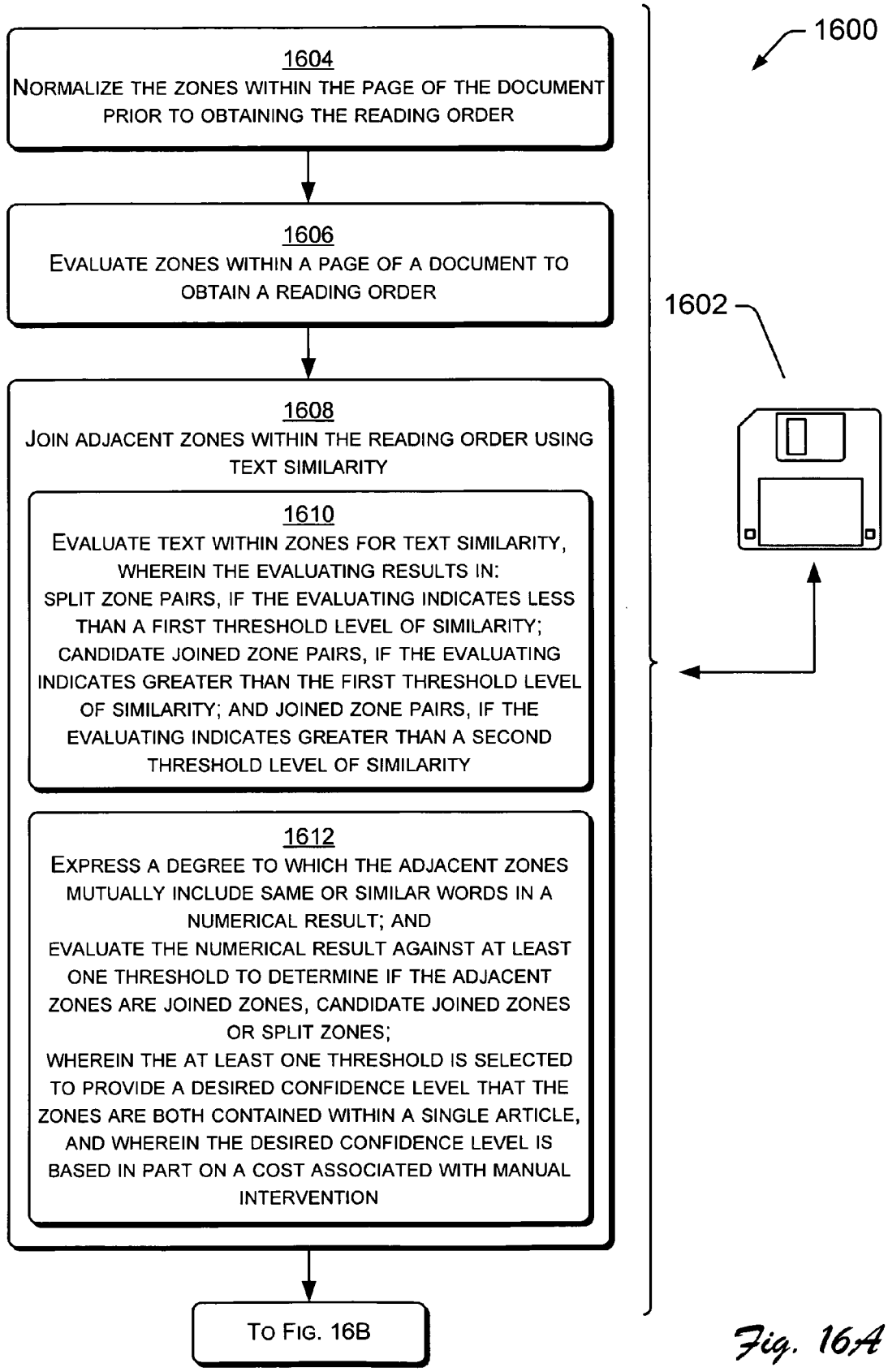
FIGS. 16 and 17 show example implementations of the operation of an article extraction tool within a document processing system.
Figure 16B:
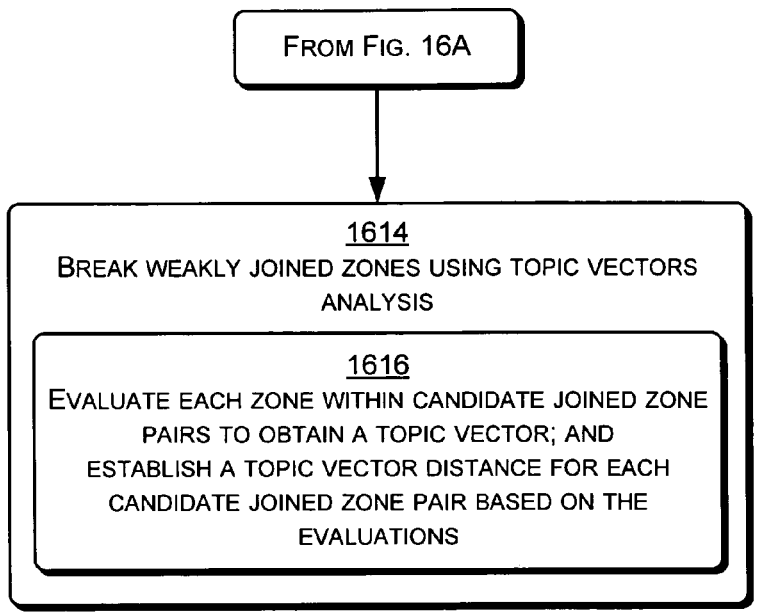

FIG. 16 shows an example implementation 1600 of the operation of an article extraction tool within a document processing system. The embodiment 1600 may be performed by any desired method, such as by implementation on a computer readable media 1602, containing computer-executable instructions consistent with the embodiment 1600. At block 1604, in an optional implementation, the zones within the page of the document are normalized, typically prior to obtaining the reading order. Referring to FIG. 1, the sub-zones 112-116 have been normalized according to one or more zone-breaking factors. The zone sequencer 1402 of FIG. 14 tends to provide more accurate candidate reading orders if the input zones are normalized.

At block 1606, zones within a page of a document are evaluated to obtain a reading order. Referring to FIG. 15, the zone sequencer 1502 is configured to obtain one or more reading orders consistent with a set of supplied or built-in rules. Generally, the relative positioning of the zones within the page of the document governs the sequence by which zones would be read by a person. However, some conflicts may arise, and the zone sequencer 1502 may produce more than one reading order.

At block 1608, adjacent zones within the reading order are joined, based on text similarity. Referring again to FIG. 14, the text correlation analyzer 1404 is configured to join zones within the reading sequence if their text correlation is high enough. The joining process of block 1608 may be performed in a number of ways, two of which are shown at blocks 1610-1612. At block 1610, text within zone pairs (i.e. adjacent zones within a reading sequence) is evaluated for similarity, particularly with reference to vocabulary. The evaluation results in the creation of split zone pairs where the evaluation results in less than a first threshold level of similarity. Candidate joined zone pairs are created if the evaluating indicates greater than the first threshold level of similarity between the text of the zone pair. Joined zone pairs are created if the evaluating indicates greater than a second threshold (which is greater than the first threshold) level of similarity between the text of the zone pair. More particularly, at block 1612, a degree to which the adjacent zones include same or similar words is expressed as a numerical result. The numerical result is then evaluated against at least one threshold to determine if the adjacent zones are joined zones, candidate joined zones or split zones. In particular, the at least one threshold should be selected to provide a desired confidence level that the zones are both contained within a single article. In many applications, the desired confidence level is based in part on a cost associated with manual intervention.

At block 1614, weakly joined zone pairs (e.g. 'candidate joined' zone pairs (wherein zone pairs are adjacent zones within a reading order)) are broken (split or disassociated) using topic vector analysis. The breaking of weakly joined zone pairs may be performed in a number of ways, such as the example of block 1616. At block 1616, each zone within candidate joined zone pairs is evaluated to obtain a topic vector. Typically, the top vector analyzer 1406 (FIG. 14) consults a topic vector database 1408, and thereby obtains the topic vector. Having obtained a topic vector for each zone within the weakly joined (candidate joined) zone pair, a topic vector distance for each candidate joined zone pair maybe established. The topic vector distance is an expression of the distance between the topic vectors of the zone pair. Thus, a greater topic vector distance would indicate the need to split the candidate zone pair into zones contained in two distinct articles.

Figure 17A:
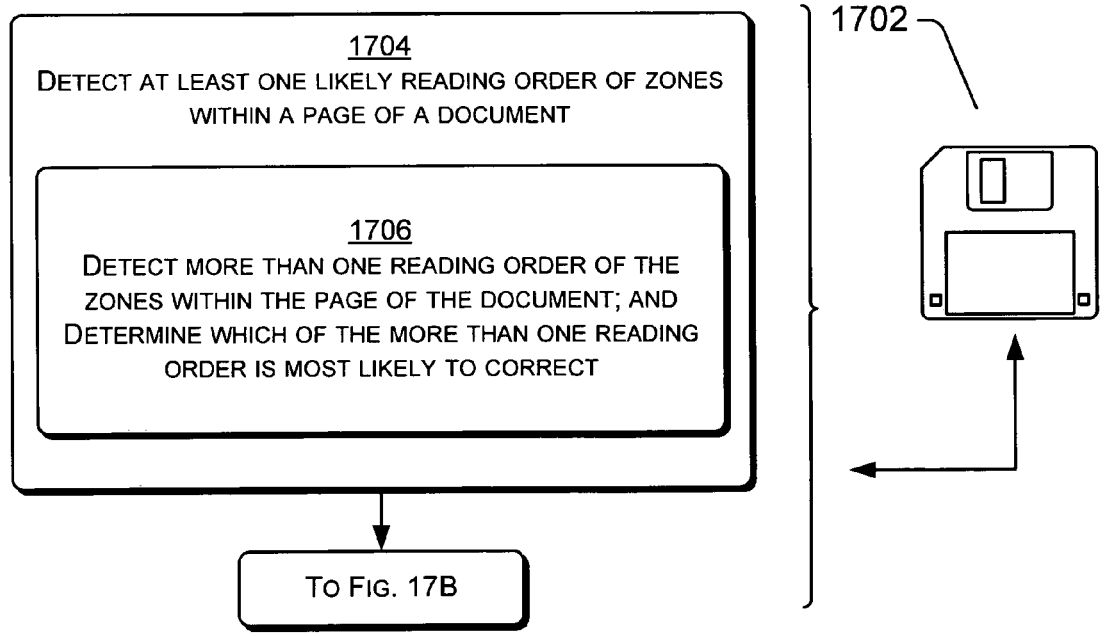
Figure 17B:
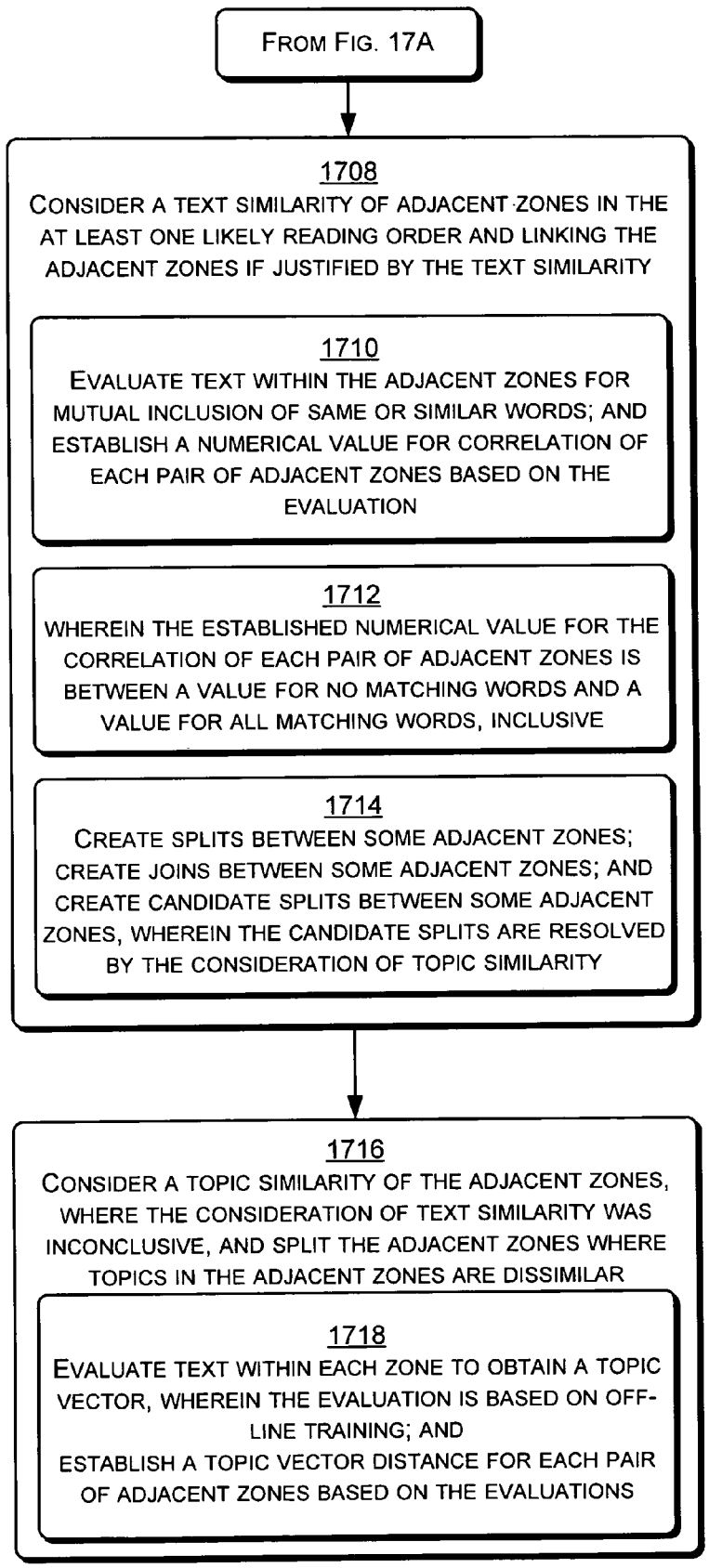

FIG. 17 shows an example implementation 1700 of the operation of an article extraction tool within a document processing system. The embodiment 1700 may be performed by any desired method, such as by implementation on a computer readable media 1702, containing computer-executable instructions consistent with the embodiment 1700. At block 1704, at least one likely reading order of zones within a page of a document is detected. In one embodiment, block 1704 may be implemented as seen in block 1706, wherein more than one reading order of the zones within the page of the document is detected. It is then determined which of the more than one reading order is most likely to correct. Referring to FIG. 14, the zone sequencer 1402 may be configured according to blocks 1704-1706.

At block 1708, a similarity of text within adjacent zones in the at least one likely reading order is considered. If the text within two adjacent zones in a reading order is sufficiently similar, then the zones are linked (i.e. 'joined' into a same article). Blocks 1710-1714 provide examples of how block 1708 may be implemented. At block 1710, text within the adjacent zones is evaluated for mutual inclusion of same or similar words. Having performed the evaluation, a numerical value is established for correlation of each pair of adjacent zones based on the evaluation. As seen in block 1712, the established numerical value for the correlation of each pair of adjacent zones can be set on a scale between a value for no matching words (e.g. 0%) and a value for all matching words (e.g. 100%), inclusive. At block 1714, splits are created between adjacent zones wherein text (e.g. text vocabulary) similarity is low. Adjacent zones are joined where text similarity is high. Candidate splits between some adjacent zones are created when the level of text similarity is inconclusive. Such candidate splits may be resolved (to split or join) by the consideration of topic similarity (e.g. topic vector similarity, as established by the topic vector analyzer 1506).

At block 1716, a topic similarity of adjacent zones is considered when the consideration of text similarity was inconclusive. The adjacent zones are split if the topic similarity is low. Block 1718 provides optional detail on the operation of block 1716. In particular, text within each zone is evaluated to obtain a topic vector, wherein the evaluation is based on off-line training. Referring to FIG. 14, the topic vector analyzer 1406 refers to the topic vector database 1408. the database 1408 includes a large amount of topic vector information that is not related to the current document (i.e. 'off-line'). Accordingly, a topic vector distance may be established for each pair of adjacent zones based on the evaluations.

Although aspects of this disclosure include language specifically describing structural and/or methodological features of preferred embodiments, it is to be understood that the appended claims are not limited to the specific features or acts described. Rather, the specific features and acts are disclosed only as exemplary implementations, and are representative of more general concepts.

The invention claimed is:

1. One or more computer-readable non-transitory storage media comprising computer-executable instructions for configuring a computer to extract an article from a document, the computer-executable instructions comprising instructions for:
   evaluating zones within a page of a document to obtain a reading order;
   joining adjacent zones within the reading order, where appropriate, in view of text similarity; and
   breaking weakly joined zones using topic vectors analysis.

2. The one or more computer-readable medium as recited in claim 1, additionally comprising instructions for:
   normalizing the zones within the page of the document prior to obtaining the reading order.

3. The one or more computer-readable medium as recited in claim 1, wherein joining adjacent zones within the reading order using text similarity comprises instructions for:
   evaluating text within zones for text similarity, wherein the evaluating results in:
      split zone pairs, if the evaluating indicates less than a first threshold level of similarity;
      candidate joined zone pairs, if the evaluating indicates greater than the first threshold level of similarity; and
      joined zone pairs, if the evaluating indicates greater than a second threshold level of similarity.

4. The one or more computer-readable medium as recited in claim 1, wherein joining adjacent zones within the reading order using text similarity comprises instructions for:
   expressing a degree to which the adjacent zones mutually include same or similar words in a numerical result; and
   evaluating the numerical result against at least one threshold to determine if the adjacent zones are joined zones, candidate joined zones or split zones;
   wherein the at least one threshold is selected to provide a desired confidence level that the zones are both contained within a single article, and wherein the desired confidence level is based in part on a cost associated with manual intervention.

5. The one or more computer-readable medium as recited in claim 1, wherein breaking weakly joined zones comprises instructions for:
   evaluating each zone within candidate joined zone pairs to obtain a topic vector; and
   establishing a topic vector distance for each candidate joined zone pair base on the evaluations.

6. A method, performed by a computer, to extract an article from a document, the method comprising:
   evaluating zones within a page of a document to obtain a reading order;

joining adjacent zones within the reading order, where appropriate, in view of text similarity; and breaking weakly joined zones using topic vectors analysis.

7. A computer to extract an article from a document, the computer comprising an article extraction tool comprising:
- a zone sequencer for evaluating zones within a page of a document to obtain a reading order;
- a text correlation analyzer for joining adjacent zones within the reading order, where appropriate, in view of text similarity; and
- a topic vector analyzer for breaking weakly joined zones using topic vectors analysis based on a topic vector database.

* * * * *